United States Patent [19]
Lee et al.

[11] Patent Number: 5,710,765
[45] Date of Patent: Jan. 20, 1998

[54] METHOD AND APPARATUS FOR INCREASING THE SYSTEM EFFICIENCY OF A TDMA SYSTEM BY REDUCING TIME SLOT GUARD TIME

[75] Inventors: Xiaoyang Lee, Monmouth Junction; Steve Lam, Cranbury, both of N.J.

[73] Assignee: Matsushita Electric Industrial Co., Ltd., Osaka, Japan

[21] Appl. No.: 623,869

[22] Filed: Mar. 29, 1996

[51] Int. Cl.$^6$ ............................................. H04J 3/16
[52] U.S. Cl. ............................................. 370/321; 30/347
[58] Field of Search .......................... 370/29, 95.1, 95.2, 370/95.3, 103, 280, 294, 314, 321, 324, 337, 341, 329, 346, 345, 347, 350.1, 503, 508, 518–520, 442; 379/97, 94; 455/33.1–33.4, 57.1, 67.1

[56] References Cited

U.S. PATENT DOCUMENTS

| | | | |
|---|---|---|---|
| 4,606,023 | 8/1986 | Dragoo | 370/94.1 |
| 4,653,049 | 3/1987 | Shinmyo | 370/95.1 |
| 5,010,567 | 4/1991 | Tsushima | 379/77 |
| 5,258,980 | 11/1993 | Maebara et al. | 375/365 |
| 5,550,992 | 8/1996 | Hashimoto | 375/355 |

*Primary Examiner*—Dang Ton
*Attorney, Agent, or Firm*—Ratner & Prestia

[57] ABSTRACT

A TDMA system with a TDMA frame format that requires no guard time, or with a maximum guard time of one clock cycle of the high timing base is applied to a network with a fixed central base, or headend, and remote units, called Premises Interface Devices (PIDs), which have a fixed communication media, such as a cable, between the headend and PID. This TDMA system is particularly useful for increasing system efficiency for CATV applications. The system method works as follows: a remote PID attempting to access the system sends a short data burst to the headend. By measuring the time difference between the time reference and the beginning of the uplink signal received, the headend will send timing correction/adjustment information to the PID. The PID then adjusts the timing of its data bursts, optionally sends a trial message and, once a verified correct transmission is acknowledged by the headend, sends regular data.

14 Claims, 9 Drawing Sheets

METHOD AND APPARATUS FOR INCREASING THE SYSTEM EFFICIENCY OF A TDMA SYSTEM BY REDUCING TIME SLOT GUARD TIME

FIELD OF THE INVENTION

This invention relates to a multiple access scheme for a communication system, and more particularly to a time-division multiple access (TDMA) system with an increased system efficiency due to a TDMA frame format that requires no guard time, or with a maximum guard time of one clock cycle of a high timing base.

BACKGROUND OF THE INVENTION

One of the known communication techniques employed in communications system is the time division multiplexed/time division multiple access (TDM/TDMA) system.

TDMA has been used in the design of a system providing telephony and other data services over cable TV (CATV) networks. In wireless communications, the distance between a remote unit and a base station varies, and consequently, the transmission time, or propagation delay, between a remote unit and the base station also varies. To resolve the ambiguity, the wireless frame structure incorporates a guard time before sending preamble and information bits within a TDMA time-slot. In a system where the remote location is fixed, such as a CATV network, the propagation delay is relatively constant because the cable lengths to remote users (Premises Interface Devices, or PIDs) remains constant once installed.

In a TDMA CATV telephony network, the central unit of a conventional TDMA system is in the headend of the CATV network. Similar remote units, PIDs, are installed in the remote locations, such as residential houses. Because the cables connecting the headend to each PID are very long and vary depending on the individual PID's location, a large guard time must be reserved to overcome the maximum propagation delay in each time slot when using the TDMA access method. This large guard time negatively affects the system efficiency. The TDMA system design of the present invention increases the system efficiency.

In a typical point-to-multipoint TDMA system, it is common for the downlink from the central unit to remote units to use TDM. The uplink from the remote unit to the central unit uses TDMA. The remote units can be connected to the central unit by either a wireless RF radio link or by a wired cable link, with these remote units using the same communication carrier.

FIG. 1 illustrates the components of a typical point-to-multipoint communications network. Cell 102 represents a portion of the geographic area served by the system. Within each cell is base station 105 which is connected to the public telephone network. Base station 105 establishes a wireless link with remote users 110-i, i=1, . . . N, which transmit and receive information (i.e., digital data representing text, speech, video, etc.) via the public telephone network. The wireless link between any given remote user 110-i and base station 105 comprises an uplink Ui for transmitting information from a user to base station 105 and then to the telephone network and a downlink Di for transmitting information received by the base station 105 from the telephone network to the user 110-i. Because each remote user 110-i only transmits information to the base station 105 for a limited period of time, communication systems have been designed to incorporate the characteristics of communicating with many remote units for brief intervals of the same communication channel. These systems are termed multiple access communication systems.

In a TDMA system, instead of assigning a frequency band to each remote unit separately, each remote unit is assigned to a specific time interval. Each remote unit is able to transmit only during its own allotted interval. This assigned time interval is called a "time slot". The remote unit that the time slot is assigned to can use the entire frequency bandwidth for its transmission. Each of the remote units operating on the same central unit transmit a data burst in a periodic time frame on the same carrier. This periodic time frame is called a TDMA frame. The transmitted timing of these bursts is carefully synchronized and placed so that the bursts from the remote units of the system arrive at the central unit closely spaced in time, but do not overlap.

In a conventional TDMA system; a guard time is reserved between data bursts. This guard time ensures that data bursts originating from different remote units accessing a common central unit do not overlap when they arrive at the central unit. The guard time must be long enough to allow for differences in transmitted timing accuracy and in the signal propagation delay due to the different locations of the remote units. The guard time is completely wasted in a conventional TDMA system.

In many TDMA systems, in addition to the guard time, some preambles are also inserted in each data burst. These preambles are used for TDMA frame and bit synchronization between the remote unit and the central unit. In a conventional TDMA system, a time slot, which refers to the total time interval that a remote unit is allowed to transmit, includes the guard time, the information bits and the other "overhead" bits.

FIG. 2 illustrates a conventional TDMA communication system frame structure. The downlink and the uplink signals are divided into a series of frames. A downlink frame 200 includes a number, N, of time slots 210 each having a duration, TS. The time slots 1 through N include information (data representing text, speech, video, etc.). An uplink frame 220 also includes a number N of time slots 230. In the uplink frame 220, each time slot 230 contains a guard time interval $T_g$ to separate the time slot from an adjacent time slot. The variable $T_g$ refers to a guard time interval included in each time slot 210 in the downlink frame 200.

The total portion of the guard time and preambles are referred to as "overhead". The ratio of the overhead portion $T_x$ to the frame time $T_f$ is called TDMA system efficiency. If a number, n, data bursts (i.e., n remote units) have been assigned into a TDMA frame, then $T_x$ can be expressed as shown in equation (1):

$$T_x = nT_g + \sum_{i=0}^{n} T_{p,i} \tag{1}$$

$T_g$ is the guard time assigned between data bursts. $T_{p,i}$ is the total time used for the preambles of the ith data burst. An increase of the overhead $T_x$ causes the TDMA system efficiency to be reduced. Usually, the guard time $T_g$ and the preambles $T_{p,i}$ are designed to be the same in every time slot of a typical TDMA system. Therefore, the TDMA system efficiency can be simply expressed as the ratio of the time of the overhead portion in each time slot to the total time of the time slot.

To increase the TDMA system efficiency, the overhead portion can be reduced. From equation (1), the overhead portion clearly consists of two different parts: guard times and preambles. Synchronization, which is dependent on the preambles, is most important for a TDMA system. Without increasing the complexity of the receiver design, reducing the number of preamble bits is difficult while retaining synchronization. Reducing the guard time is also difficult because the guard time is limited by physical channel conditions of the real network, such as propagation delay.

FIG. 3 is a functional block diagram of a conventional TDMA transmitter-receiver link (described in Steele R., "Mobile Radio Communications", IEEE Press, 1992, pp. 68–69 and which is hereby incorporated by reference for its teachings on TDMA transmitter-receiver links). An encoder 300 receives and encodes information. It is understood that information may be speech, text, graphics, etc. A channel coder 305 receives the encoded information and formats the encoded information for transmission. An interleaver 310 reorganizes the data provided by the channel coder 305. A packetizer 315, using synchronizing supervisory information, accepts the coded interleaved digital information and forms a packet which is stored in a buffer 320. The buffer 320 releases the packet as a data burst to a modulator 325 for transmission over a channel 330. The high speed data suffers considerable distortion during its transmission over the channel 330. The principle sources of this distortion are the frequency response characteristic of the channel and multipath distortion. This distortion must be compensated for at a receiver front-end 335. The receiver front-end 335 demodulates the signal and forwards the demodulated signal to a demultiplexer 340 to yield the channel data and the propagation channel data. The channel data is applied to a matched filter 345 which has an impulse response that is matched to a predetermined sequence 317 inserted into the packet prior to transmission. Should the sequence at the transmitter be passed through the matched filter 345 (i.e., an ideal channel) a sharp pulse of two bits width is produced. If this sharp pulse were passed through the equivalent baseband channel, the impulse response of the channel would be obtained, slightly degraded by the sharp pulse not being an ideal delta function. The ambiguity function 350 is a filter which has an impulse response that is the convolution of the sequence with the matched filter impulse response. Channel equalization is then performed on the traffic data by an equalizer system 355, using information about the channel obtained from the matched filter. Having regenerated the data in the packet, de-interleaving is performed by a de-interleaver 360 followed by channel decoding and information decoding, by a channel decoder 265 and an information decoder 370, respectively.

The basic TDMA arrangement in FIG. 3 can also be used where a remote unit is transmitting information to the base unit. When the remote unit transmits information to the base unit, no synchronizing supervisory information is provided to the packetizer, as this is not used in the uplink.

A method of reducing guard time is described in a U.S. patent issued to Dragoo (U.S. Pat. No. 4,606,023). In Dragoo, the timing adjustment is performed at the remote site, rather than at the headend. Because the timing adjustment is made at the remote site instead of at the headend, the timing adjustment does not have a high degree of certainty. Moreover, due to the single pulse nature of Dragoo, the invention of Dragoo is limited to operating only within a preassigned address or frame time on the TDMA. Dragoo can only adjust the guard time within one-half of one frame time. Therefore, the flexibility of Dragoo is limited.

The foregoing illustrates the limitations known to exist in TDMA system efficiency. Thus, it is apparent that it would be advantageous to provide a TDMA system which will have an increased system efficiency.

SUMMARY OF THE INVENTION

The present invention provides a method to increase the efficiency of a TDMA system. More specifically, this invention provides an access method to increase the system efficiency of a TDMA system that is used for carrying telephony service and other data services over existing CATV networks.

The present invention relates to the field of TDM/TDMA transmission channel structure in a fixed point-to-multipoint communications apparatus, method, or system in which there is uncertainty at the PID or remote user and the headend or base station as to the propagation delay of a signal between two locations. The TDM/TDMA structure described mainly refers to use in CATV networks, but could be used in any cable or wired communication or telephony channel.

This invention measures transmission delay between the headend/base station and the remote/PID by using specialized messages in the uplink and downlink TDMA frame transmission structure. Once the propagation delay is known by the headend or base, the PID adjusts the timing between the downlink reception and uplink transmission to correct for the uncertainty in reception time at the headend caused by the propagation delay. Because the uncertainty is removed, the TDMA frame does not require large guard time intervals between TDMA frame time-slots, increasing the amount of time in a frame available for information.

In this invention, a TDMA system with virtually no guard time or with a maximum guard time of one clock cycle of the high timing base signal (not the transmitting data clock signal) for each time slot is achieved. The PID seeking access to the system initially sends out a short data burst to the headend. By measuring the time difference between a reference time and the time the uplink signal is received, the headend sends timing adjustment instructions to the PID. According to this instruction, the PID adjusts its transmitted timing reference by sending out the uplink signals several clock cycles of the high timing base earlier. The total adjusted time is equal to or close to the propagation delay of the network. After the PID's transmitted timing has been correctly adjusted and verified by the headend, this PID can start regular communication with the regular data burst length. The time difference between the length of the regular data burst and the length of the shorter data burst is preferably greater than or equal to the maximum signal propagation delay of the network. NO extra guard time needs to be reserved in each time slot during the regular communication. Therefore, the system efficiency of a TDMA system using this invention can be greatly increased compared with a conventional TDMA system.

The foregoing and other aspects of the present invention will become apparent from the following detailed description of the invention when considered in conjunction with the accompanying drawings.

DETAILED DESCRIPTION OF THE EXEMPLARY EMBODIMENTS

Figure 3:
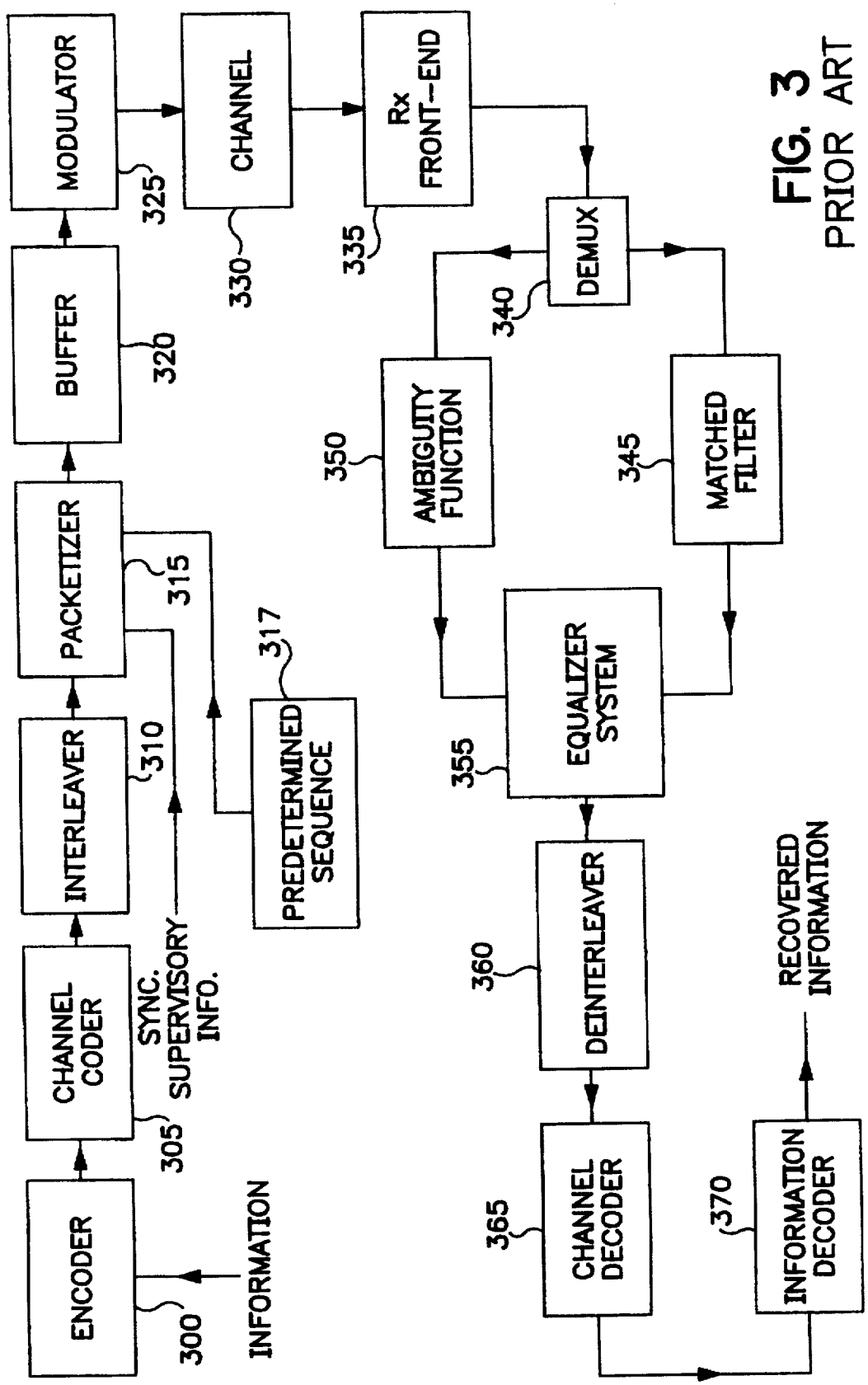
FIG. 3 (Prior art) is a functional block diagram of a conventional TDMA communication system.

Although the invention is described as being implemented in a TDM/TDMA system such as that shown in FIG. 3, it is contemplated that it may be implemented in any of a number of TDM/TDMA systems in which the propagation delay between the base station and the user units is fixed or varies relatively slowly in comparison to the rate at which signals are transferred between the base station and the user units.

Figure 1:
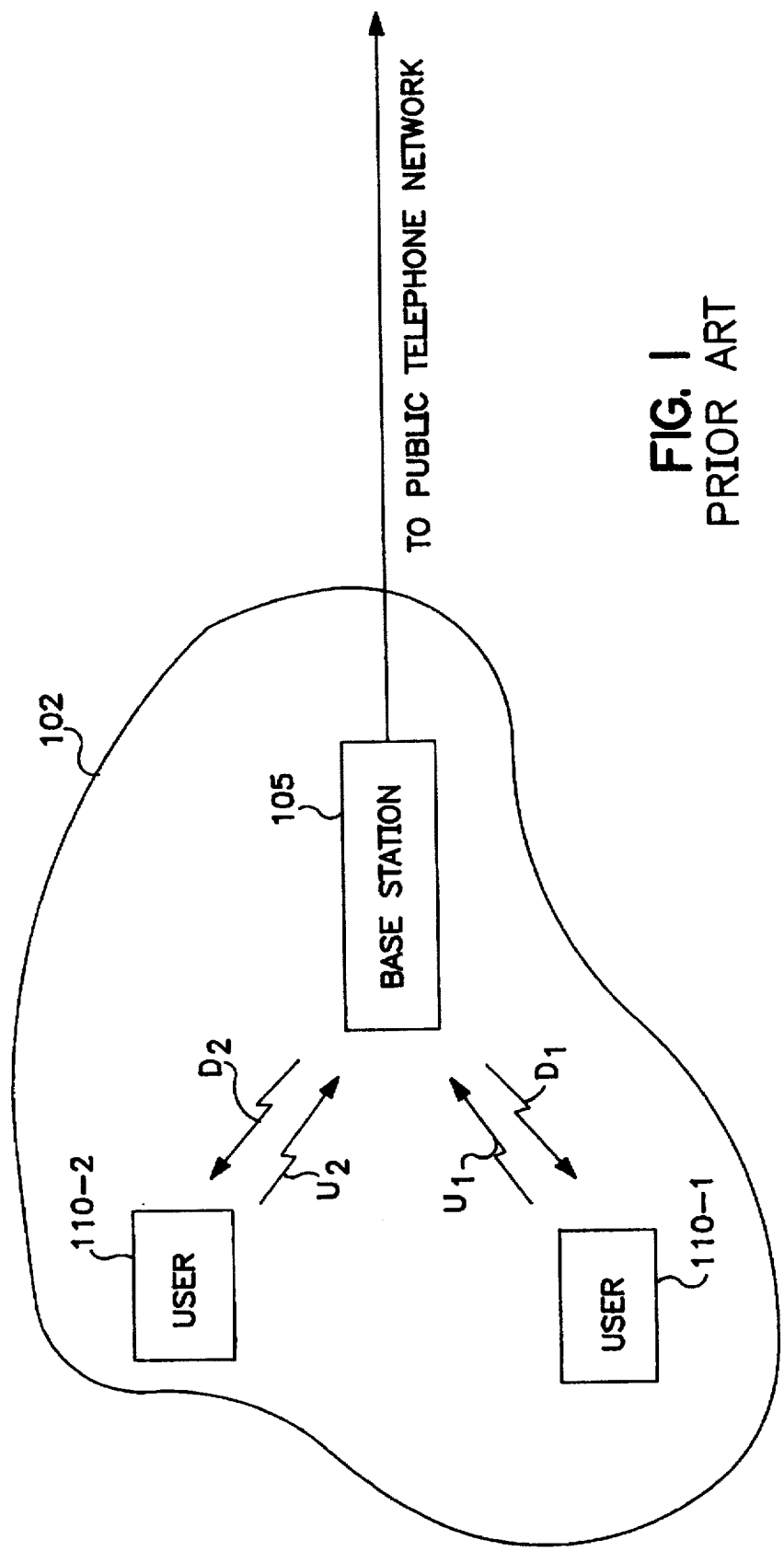
FIG. 1 (Prior art) is a block diagram of a conventional cellular communications network.
Figure 2:
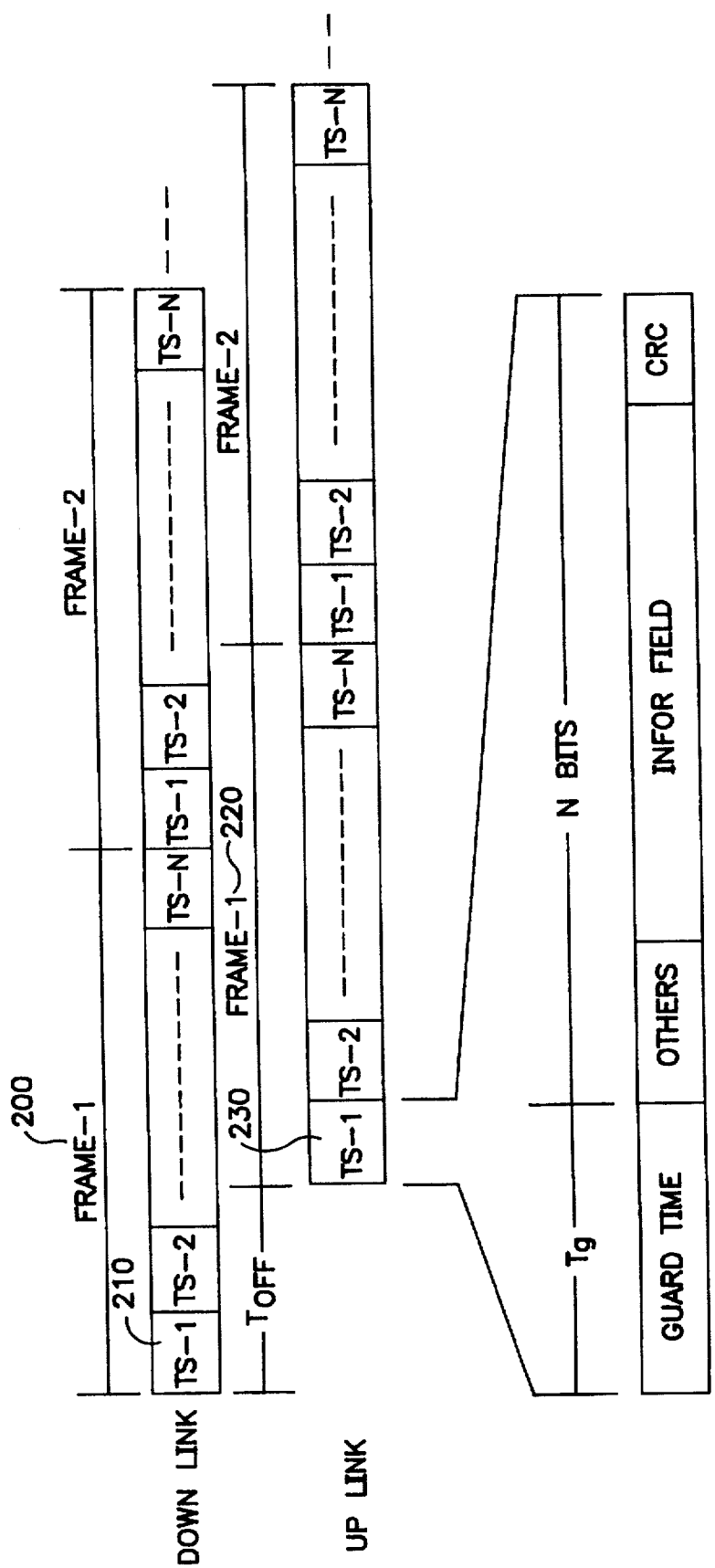
FIG. 2 (Prior art) illustrates a frame structure used in a conventional TDMA communication device.
Figure 4:
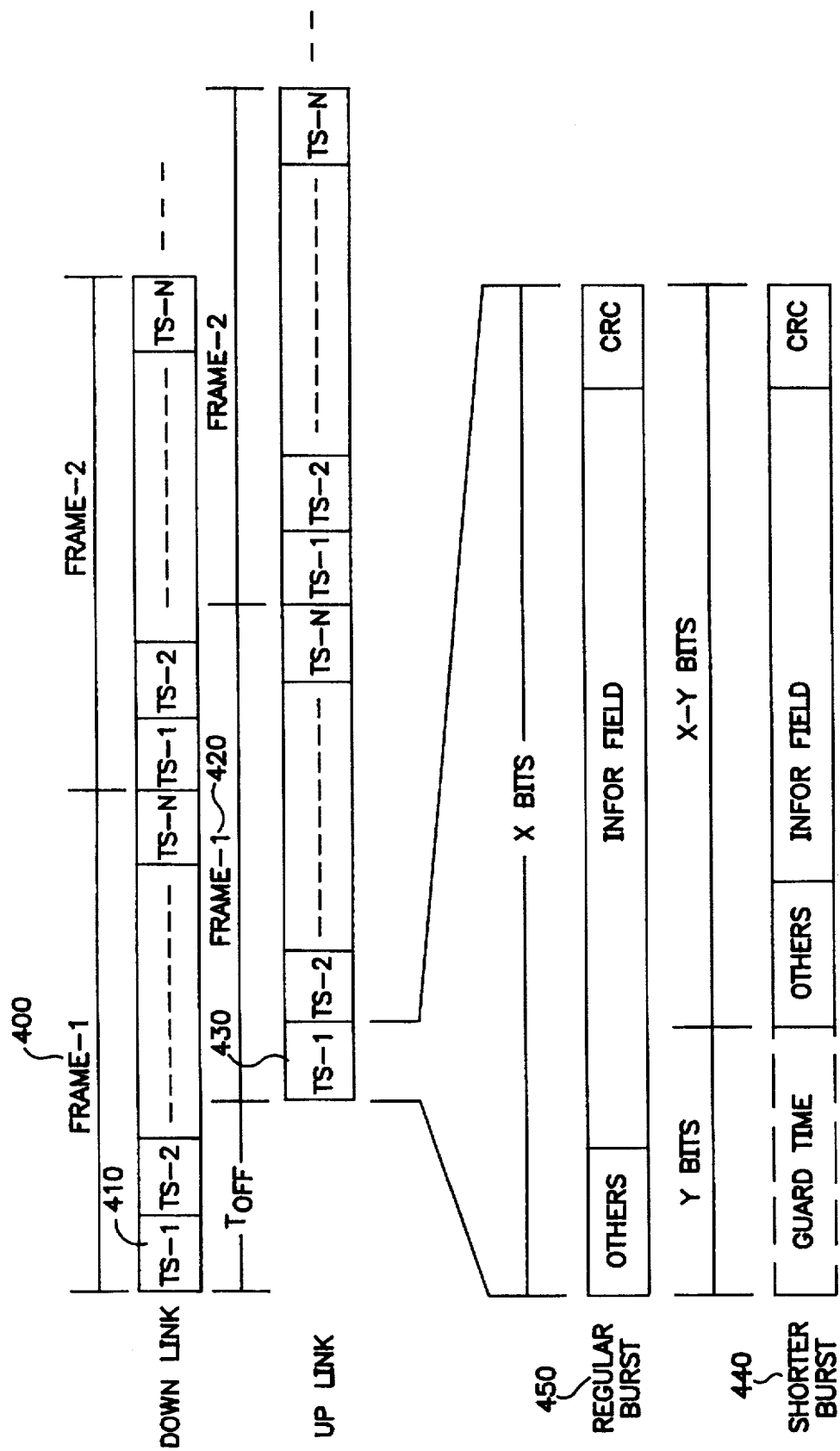
FIG. 4 illustrates a frame structure used in an exemplary embodiment of the present invention.

FIG. 4 illustrates a frame structure used in an exemplary embodiment of the present invention. The TDM downlink frame 400 is similar to the downlink frame 200 shown in FIG. 2. The downlink frame 400 includes N time slots 410 each having a duration of TS. An uplink frame 420 also includes N time slots 430. Each time slot 430 comprises the information for either a regular burst 450 or a shorter burst 440. The time slot of the shorter burst 440 contains X bits, but contains a guard time which accounts for Y bits of the X bit total. The time slot of the regular burst 450 also contains X bits and does not contain a guard time. As a result, more bits are available to carry information in a regular burst than in a short burst.

Figure 5:
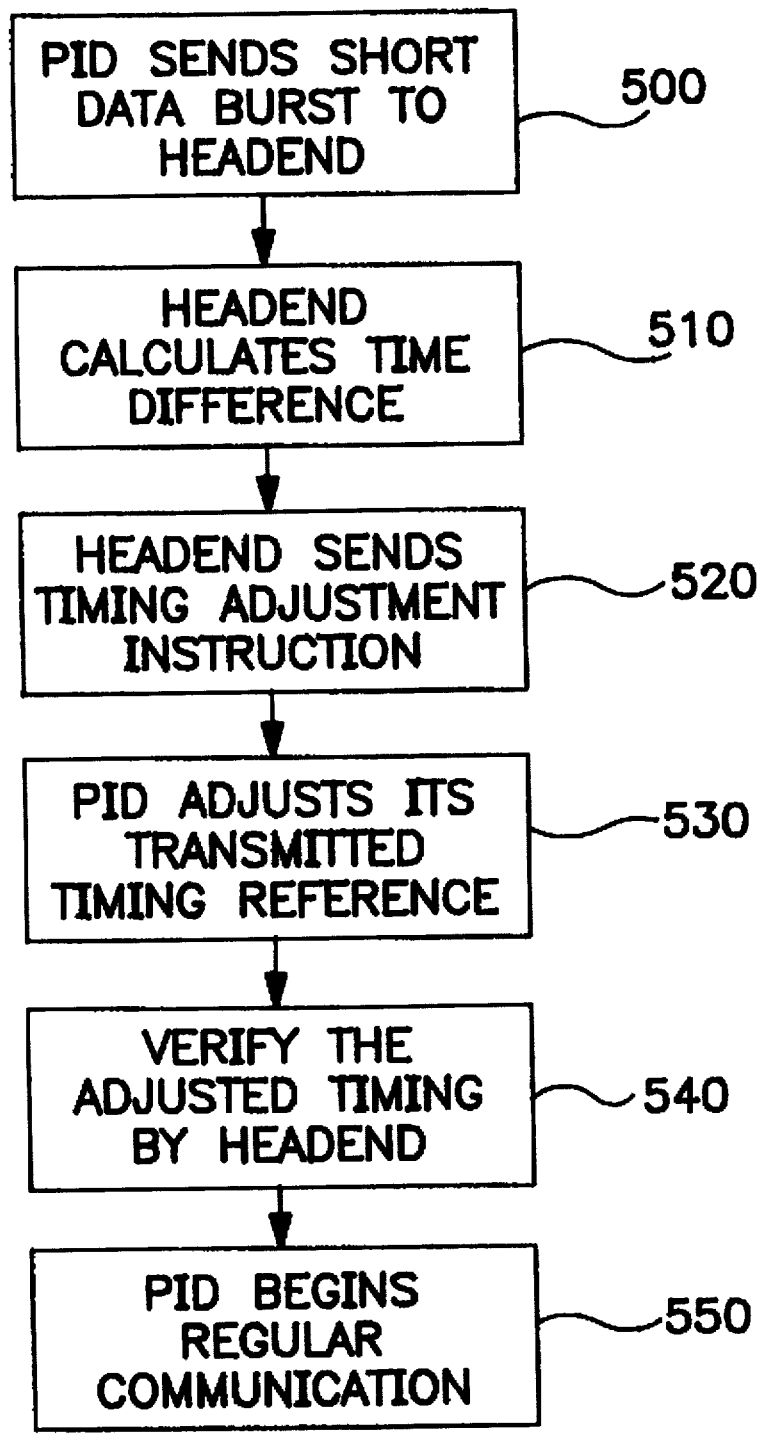
FIG. 5 is a flowchart of the processing performed in an exemplary embodiment of the present invention.

To reduce the guard time required by the propagation delay, an exemplary method as set forth in the flowchart of FIG. 5 can be used. These steps are performed by the packetizer 315 of FIG. 3. First, at step 500, a PID seeking to communicate with the headend initially sends a data burst which is shorter than the length of a regular data burst. At step 510, the headend calculates the time difference between a reference time and the time the uplink signal is received. Based on this time difference, at step 520, the headend sends correcting timing information through the downlink to the specified PID. The timing adjustment is based on the time between when the headend receives the uplink signals and when the headend sends out the downlink signals. At step 530, the PID adjusts the transmitted timing according to the received timing adjustment information. For example, the PID sends out a data burst m bits early based on the instructions received from the headend. After the timing has been adjusted by the PID and verified by the headend at step 540, the PID sends a regular length data burst at step 550, thus initiating regular communication. Since the time difference between the regular data burst length and the shorter data burst length is larger than or equal to the network propagation delay time, the guard time reserved in each uplink time slot is not needed. Based on this method, the smallest timing adjustment step is one transmitted bit time. Therefore, after the timing adjustment, the maximum unused/wasted time in each time slot is less than or equal to one transmitted data bit time.

To achieve a more accurate timing adjustment, a high timing clock base signal can be used in a further exemplary embodiment of the present invention. The transmitted data clock is derived from the high timing clock base. Assuming the transmitting data clock $f_T$ is derived from a high timing base frequency $f_0$ (where $f_0 = N*f_T$), then the smallest step of the timing adjustment will be smaller than one clock cycle of the high timing base signal. According to the instruction that the PID receives from the headend, the PID can adjust its transmitted timing reference by sending out the data burst n high timing base clock cycles earlier instead of sending it out m transmitted data bits earlier. In the previously described method, the maximum unused/wasted time is less than or equal to one transmitted data clock cycle ($1/f_T$) after the timing adjustment. Using a high timing base, the maximum unused/wasted time in each time slot will be reduced to one high timing base clock cycle ($1/f_0$) which is N times less than the transmitted data clock cycle time.

To illustrate the advantages of the system of the present invention over a conventional TDMA system, for a CATV telephony network, assume a CATV network has a maximum coaxial cable length of 12000 feet, and the maximum velocity of the propagation delay of the coaxial cable is 1.9 nS/foot. For a worst case design, the signals from the closest PID may have only a couple of feet cable propagation delay, and the signals from the far end PID may have the maximum 12000 feet cable propagation delay. To ensure that the data bursts sent out from all of the PIDs at different network locations never overlap when they arrive at the headend, the reserved guard time between bursts (the portion of the time slot used for carrying the actual data) must be equal to or greater than the maximum round trip propagation delay of the system. For the above specified cable length and the delay velocity, this maximum guard time is about 46 μS.

Further assume the following parameters for a defined TDMA network:

Transmission rate=1.3 Mbps

Frame Time=5 mS

User Information=160 bits, 32 Kbps

CRC=16 bits

Others=4 bits (used for carrying non-user information)

Figure 6:
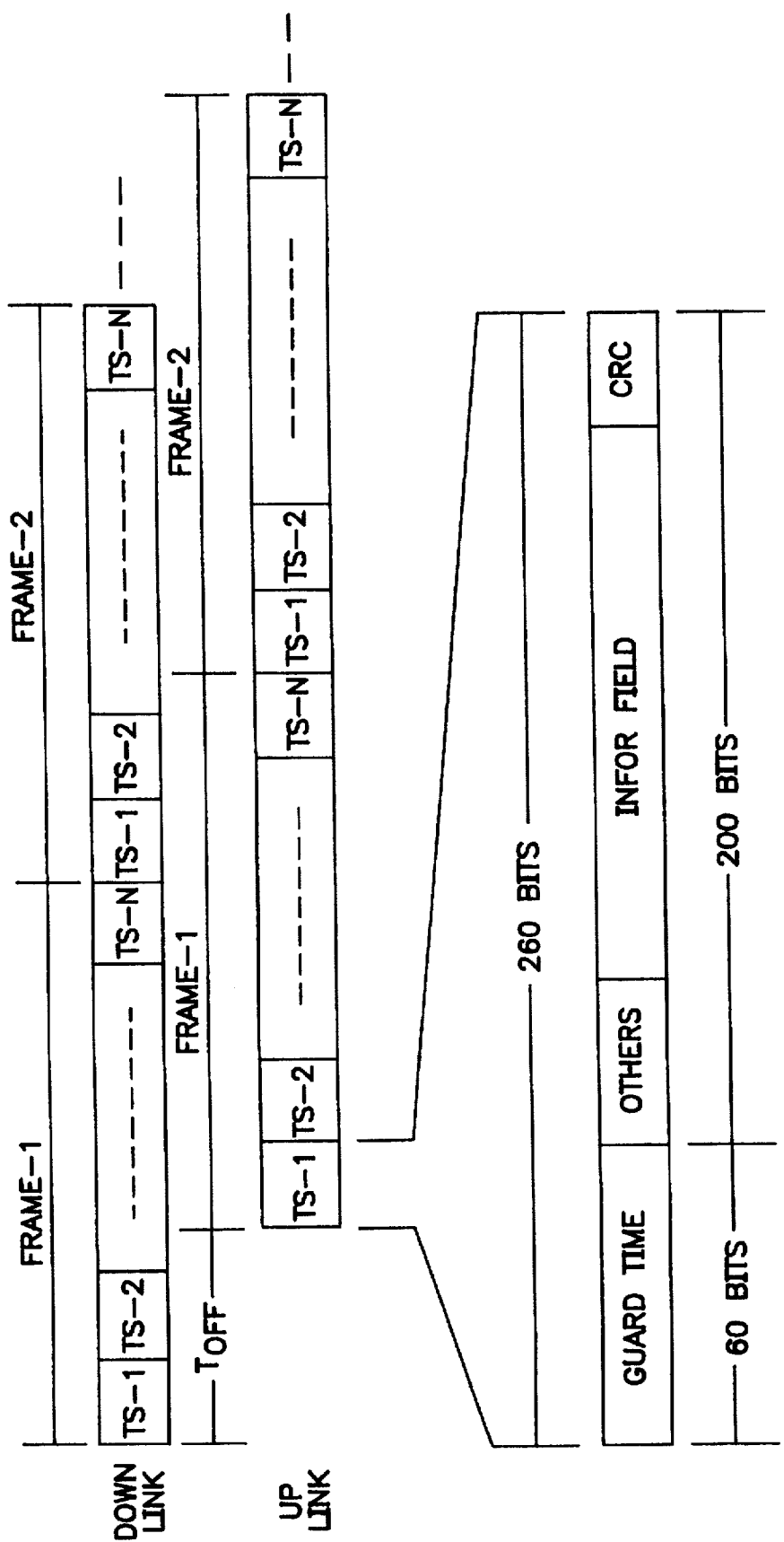
FIG. 6 (Prior art) illustrates a frame structure used in a conventional TDMA communication system.

Based on the above transmission rate of 1.3 Mbps, the necessary guard time of 46 μS is about 60 bits. In the design of a conventional TDMA system frame structure as shown in FIG. 6, these 60 bits reserved for the guard time are inserted between the transmitted data bursts. For an information field of 200 bits, a time slot of 260 bits is used. Only 25 time slots with 260 bits per slot can be allocated in one TDMA frame. No data transmission is allowed within the guard time. In such a system, the guard time corresponds to 60 transmitted bit intervals, and the bandwidth represented by these 60 bits is totally wasted.

From FIG. 6, the PID must send out the uplink signal in the specified time slot an amount of time, $T_{OFF}$ seconds, after it receives the signals from the corresponding downlink time slots. Practically, from the view of the headend, the time difference between the downlink and uplink signals will be $T_{OFF}+2T_d$ seconds because of the signal propagation delay, $T_d$, between the specified PID and the headend. In this particular network, as mentioned above, the maximum guard time reserved must be 46 μS which is about 60 bits. The efficiency of this TDMA system is only about 61.5%.

To increase the system efficiency and to make use of the guard time, an access method of the present invention can be applied. For a CATV system, each PID's location is fixed, and the delay time caused by the system is fixed. If a common timing reference can be recognized or established by either side, the guard time compensating for the network propagation delay can be eliminated. This can be done by using a shorter data burst transmission.

Figure 7:
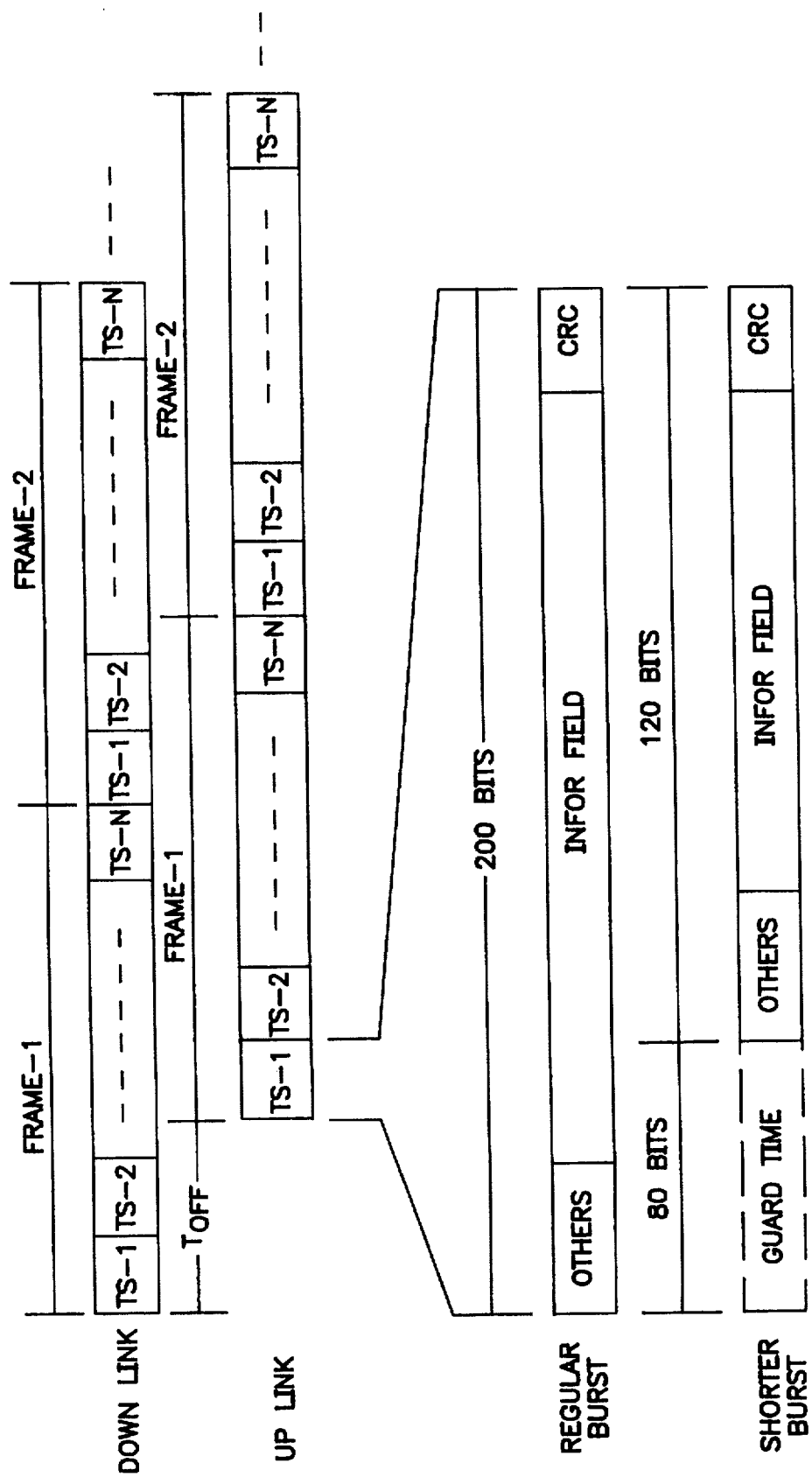
FIG. 7 illustrates a frame structure used in an exemplary embodiment of the present invention.

An exemplary frame structure in accordance with the present invention is shown in FIG. 7. In the system of the present invention, the number of bits used for information data transmission in each time slot remains the same as the original: 200 bits per time slot. However, the total number of bits assigned to each time slot is much less (200 versus 260) due to the elimination of the unnecessary guard time. This system is described as follows.

For initial channel access, a shorter data burst is transmitted. The timing adjustment can be made anywhere as it is not only limited in the initial channel access. In this shorter data burst, a total of 120 bits instead of 200 bits are used for the initial information access. The remaining 80 bits of the time slot can be used to compensate for the network propagation delay (functioning as the guard time used in the previous format) during the timing adjustment. The PID adjusts the transmission timing reference according to the instructions received from the headend.

Of course, the PID needs to be synchronized with the headend before it transmits the short burst. For example, the propagation delay from the headend to a PID is x seconds. The headend has a counter that runs under the high timing base clock signal at a frequency of $F_0$. This counter is reset to zero for every frame, and the headend reads the counter number when it detects the beginning of the first uplink signal. If the headend can track the counter number, resetting the counter every frame is not necessary. After the headend sends out the downlink signal, it receives an uplink signal from the PID. This uplink signal is a shorter dam burst. In this particular design, the information in the shorter data burst is 120 bits long. The headend detects this uplink signal (referenced to the beginning of this time slot) 2× seconds later than the originally defined offset time $T_{OFF}$ by reading the counter number. This extra 2× second delay is caused by the round trip propagation delay. The counter should be read as (b+m+c*y), where b corresponds to $T_{OFF}$ as defined earlier, m is the number of cycles of the high timing base corresponding to the 2× second extra delay, c is the number of this particular time slot, and y is the number of cycles of the high timing base for each time slot. For example, if the channel this PID accessed is in time slot number 3, then the number (c*y) will be equal to (3*200*N), where "3" is the number of this time slot, "200" is the number of transmission bits per time slot, and N is the ratio of the high timing base to the transmitted data clock. In general, the delay time 2× should be represented according to equation (2).

$$2x=m/F_0+\Delta t \quad (2)$$

where:

2× is the round trip propagation delay $F_0$ is the high timing base m is the counter number $\Delta t$ is the remaining time that is less than one cycle time of the high timing base Therefore, the headend sends the command to request this PID to transmit its next uplink signal m clock cycles of its own high timing base $F_0'$ earlier. The high timing base $F_0'$ of the PID is phase related to the high timing base $F_0$ of the headend with an allowed phase error.

Synchronization of clocks is described in a U.S. patent issued to Smith, III (U.S. Pat. No. 5,146,585) and which is hereby incorporated by reference for its teachings on synchronizing clocks in different locations.

After the PID sends the next uplink signal according to the timing adjustment instruction of the headend, the headend determines the timing adjustment result by sensing the time difference between the reference time and the beginning of the received uplink signal. Based on the timing adjustment result, the headend can send a command to request the PID to make a further timing adjustment, or can send a confirmation to request the PID to make a further timing adjustment, or can send a confirmation to ask the PID to start regular communication with a regular data burst length. After the timing adjustment, the unused portion of the data burst in each time slot for regular communication should be $\Delta t+\Delta\theta$, where $\Delta\theta$ is the phase error between $F_0$ and $F_0'$. The unused time portion is much smaller than the guard time used in the conventional TDMA system, and may also be much smaller than one transmitted data bit time depending on the ratio of $F_0$ and $F_T$. The offset time $T_{OFF}$ between the downlink and uplink signals should be at least greater than the maximum propagation delay of the system.

For the particular system designed above, each time slot will have only 200 bits when the unused portion $\Delta t+\Delta\theta$ is neglected. In other words, the total number of bits per time slot has been reduced from 260 bits in the conventional frame structure to 200 bits in the frame structure of the exemplary embodiment of the present invention. For the same transmission rate, frame time, etc. defined earlier, the total number of time slots that can be allocated within the same TDMA time frame (5 mS) will be increased from 25 to 32.5. The network capacity has been increased 30% compared with the old network in which each time slot had 60 bits wasted for the guard time. Correspondingly, the system efficiency of the new system has been increased to 80%. Even when the extra information exchange between the PID and the headend during the timing adjustment period is considered, the system efficiency is still greatly improved compared with the conventional TDMA system.

This exemplary TDMA network not only saves the guard time wasted in the conventional TDMA system, but also tolerates a larger network propagation delay. Because during the system timing adjustment only 120 bits within the 200 bits time slot have been used for transmitting the shorter data burst, the extra 80 bits, corresponding to about 62 μS in time, can be used for the guard time to compensate the system propagation delay. These 80 bits (about 62 μS in time) are more than the 60 bits (about 46 μS in time) originally reserved for the guard time of the old system. Based on the parameters of the CATV network used before, the TDMA system using this invention can be used in such a CATV network which can have a maximum cable length of up to 16300 feet.

Figure 8:
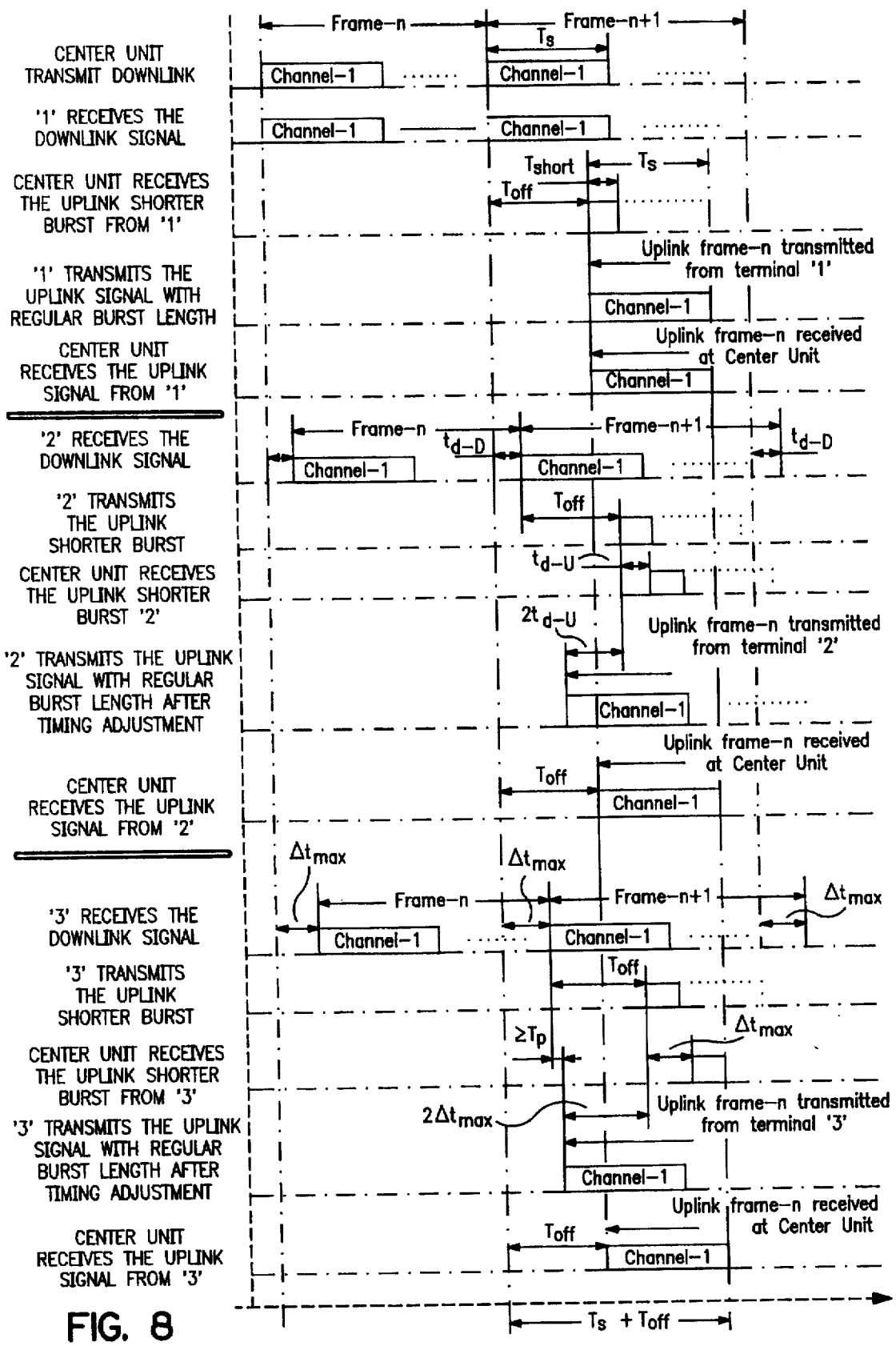
FIG. 8 is a timing diagram of an exemplary embodiment of the present invention.

FIG. 8 is a timing diagram of an exemplary system in accordance with the present invention. This timing diagram shows the transmitting and receiving timing relations between the headend and the remote terminals (PIDs). The downlink uses TDM and the uplink uses TDMA. In FIG. 8, three remote terminals 1, 2 and 3, from three different locations, are illustrated. Terminal 1 is at minimum distance from the headend, terminal 3 is at a maximum distance from the headend, and terminal 2 is at a distance between terminals 1 and 3.

In FIG. 8, the slot time, $T_s$, does not increase. No matter where the remote terminal is, as long as the one-way propagation delay time is less than or equal to the maximum one-way propagation delay time, $\Delta t_{max}$, there is no signal overlap occurring when the uplink signals arrives at the headend.

In an exemplary embodiment of the invention, the slot time, $T_s$, is desirably larger than the maximum round trip delay time plus a shorter data burst time, $T_{short}$; i.e., $T_s \geq 2\Delta t_{max} + T_{short}$. The shorter burst time, $T_{short}$ is the maximum time of an access message originating at the remote terminals.

The desired offset time between the downlink and corresponding uplink signals is shown in FIG. 8 as $T_{off}$. The maximum one-way signal propagation delay time, $\Delta t_{max}$, corresponds to the maximum distance from remote terminal (s) to the headend within the network.

To adjust the timing, the fixed offset time, $T_{off}$ is provided between the downlink and uplink signals. The downlink TDM signal can be either channel or whole block depending on the embodiment. The offset time, $T_{off}$, is a pure delay time between the downlink and uplink signals and does not affect the slot time, $T_s$.

In FIG. 8, $T_p$ represents the maximum data processing time needed at the remote terminal side. It is assumed that the data processing time is shorter than the maximum propagation delay time. As shown in FIG. 8, the offset time is desirably greater than the network's maximum round trip delay plus the maximum data processing time needed at the terminal side. In other words, $T_p < T_{off} - 2\Delta t_{max}$.

Therefore, $T_{off} = 2\Delta t_{max} + T_p + \Delta$, where $\Delta$ is any necessary margin time.

Also, in FIG. 8, $t_{d-D-i}$ represents the downlink signal propagation delay time for a particular remote unit and $t_{d-U-i}$ represents the uplink signal propagation delay for sending from a particular remote unit. In an exemplary embodiment of the invention, $t_{d-D-i} = t_{d-U-i} = t_{d-i}$; i=1, 2, ... For FIG. 8, i=2.

FIG. 8 only shows the remote terminals access to the network from a particular uplink channel. If a remote terminal seeks access to the network from an uplink channel "n", the procedure is very similar. The remote terminal seeking access to the network from the uplink channel "n" sends an access message in the shorter burst with the extra time delay corresponding to the uplink signal sending reference point. Here, the reference point is the end of the received downlink frame time at this particular remote terminal. This extra time delay is equal to (n-1) time slots. Therefore, the total delay time when the remote terminal sends the uplink access message from uplink channel "n" is $T_{off} + (n-1)*T_s$.

Figure 9:
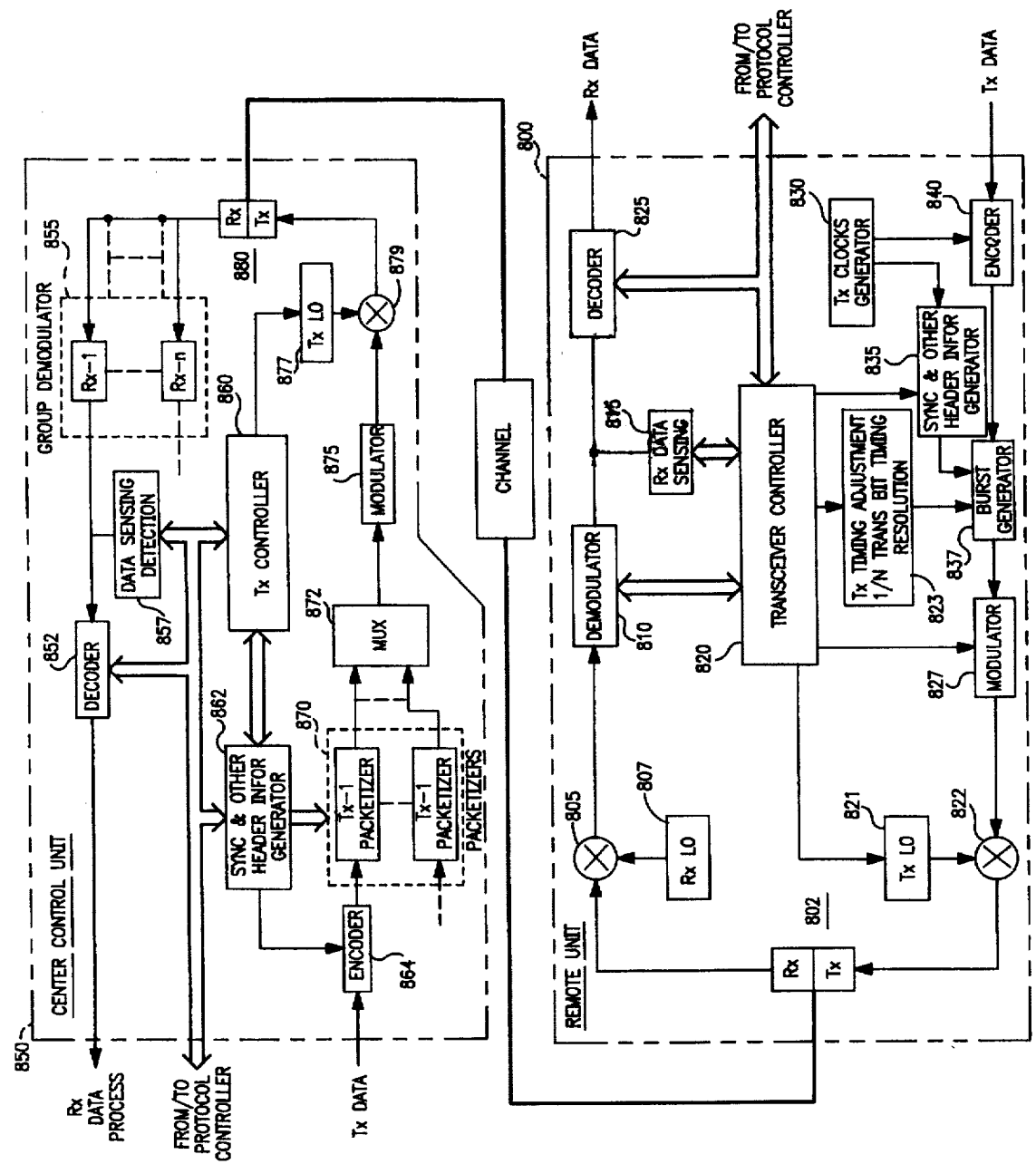
FIG. 9 is a functional block diagram of an exemplary embodiment of the present invention.

FIG. 9 is a functional block diagram of an exemplary system in accordance with the present invention. A remote terminal unit 800 (i.e., a PID) and a center control unit 850 (i.e., the headend) are shown.

At the remote terminal side, a duplexer 802 consists of two filters which separate the downlink and uplink signals. Note the uplink and downlink channel signals are FDD (frequency domain duplex). A mixer 805 and a receive local oscillator Rx LO) 807 provide a suitable local oscillating frequency to make the necessary down conversion for the downlink signals passed by the duplexer 802. The Rx LO 807 is controlled by the transceiver controller 820. The transceiver controller 820 is under the control of the protocol controller (not shown) or similar microcontroller of the remote terminal 800. A demodulator 810 performs the required functions according to the modulation technique used by the center control unit 850. The demodulator 810 provides certain error signals to the transceiver controller 820, and the transceiver controller 820 uses these signals to instruct the Rx LO 807 to perform any necessary local carrier adjustment. After carrier and bit synchronization have been achieved, the demodulator 810 removes any preambles and synch patterns, and provides the data to the decoder 825.

An Rx data sensor 815 monitors the output of the demodulator 810. The major purpose of the data sensor 815 is to mark the receiving time reference when the downlink channel signals have been received. The data sensor 815 provides this timing reference to the transceiver controller 820. Under the control of the protocol controller, the transceiver controller 820 instructs the remote terminal 800 when it should send its uplink signals based on this timing reference.

A decoder 825 performs any necessary coding-related functions. Based on the decoding result, the decoder 825 informs the transceiver controller 820 and the protocol controller. According to the result, the protocol controller might dump the error data block, and the transceiver will reset the Rx data sensor 815 and/or fine tune the local carrier recovery circuitry. The data output from the decoder 825 requires further data processing. For example, if the downlink signal is sent in a block format (multiple channel signal coded in one data block), the terminal only needs to pick up the signals from one particular channel, and this decoded signal from the decoder 825 needs to be further filtered, re-clocked and sent to the final destination. Because these procedures do not affect the timing compensation process, they are not shown in the block diagram.

A transmit (Tx) clock generator 830 generates suitable clock signals for the encoder 840 and a sync pattern and other header information generator 835. The generator 830 is under the control of the transceiver controller 820.

An encoder 840 performs any necessary coding techniques needed for the data channels. This coded signal is sent to a burst generator 837.

The sync and other header information generator 835 is controlled by the transceiver controller 820 and the protocol controller (not shown). The sync and other header information generator 835 provides necessary synch pattern and other necessary header information without encoding. These sync pattern and header information bits are combined with the coded data information to form the uplink transmitting data burst.

The burst generator 837 generates the uplink data burst with precise timing and length. The burst generator 837 consists of two portions, the first of which is used to form the transmitting data packet. This can be done through a buffer and necessary S/P and P/S conversion. The second portion generates the burst data by feeding the bit-serial data into the modulator 827 by using the parallel to serial converter under the control of the transmitting data clock. This clock signal is generated from the Tx timing adjuster 823. The formed transmitting packet can be done within $T_p$ time. In the case in which the transmitting packet cannot be done in time, only the total delay time between the request and the response is affected. The delay compensation adjustment is still be carried out.

A Tx timing adjuster 823 is a special transmitting clock generator. This clock generator 823 consists of a high timing base, a set of counters with set/reset functions, several flip/flops and many logic gates. The high timing base is free running, its frequency is 'N' times higher than the designed transmitted bit clock and is referred to as $T_N$. Two special pre-scalars are designed from these counters and other logic parts. The output of one pre-scalar is the transmitted bit clock. The other one has a burst output to shift the formed transmitting packet to the transmitting buffer. This clock signal is referred to as $T_{conv}$. This transmitting buffer works with the transmitted data clock to perform the P/S conversion.

The output standby level is logic '0' when the pre-scalars are in the reset state. The pre-scalars can be reset at any time. The counters used in the pre-scalars are triggered by a positive-going edge. The high timing clock signal is gated by a control signal from the transceiver controller 820. When this control signal is set to logic '0', there is no high timing clock signal provided to the pre-scalar. When the control signal is set to logic: '1', the high timing clock signal is provided to the pre-scalar. If the delay time caused by the pre-scalars is negligible, then the pre-scalars provide the positive-going edge of the transmitted bit clock signal when the first rising edge of the high timing clock signal is provided to the pre-scalars. Therefore, any delay applied to the control signal (high timing base gate control signal) causes a transmitted bit clock delay. The delay resolution should equal one clock cycle of the high timing base.

The transmitted bit clock signal controls the parallel to serial conversion of the burst generator 837. Therefore, the output of the burst generator 837 can be delay-adjusted by the Tx timing adjuster 823 with an adjustment resolution of 1/N transmitted bit time. The offset time $T_{off}$ designed between the downlink and uplink channel signals, ensures that the transmitting data packet has been formed in the parallel to serial converter whenever the transmitting bit clock signal is applied to the burst generator 837.

As described above, the timing reference of the received downlink signals is detected and marked by the Rx data sensor 815 and the transceiver controller 820. The uplink signal is transmitted after a predefined time offset $T_{off}$. Therefore, the conversion clock signal $T_{conv}$ is generated after 'M' high timing clock cycles, assuming $T_{off}=M*T_N$.

Under the instructions received from the downlink channel in the next frame, the $T_{conv}$ generator adjusts its delay time. For example, the round trip delay calculated at the center control unit 850 is $2\Delta t_{max}$, and this $2\Delta t_{max}$ is rounded up to 'm' high timing clock cycles. Thus, the corresponding correct delay time should be $T_{off}-2\Delta t_{max}$. This means that the $T_{conv}$ generator generates its output $(M-m)*T_N$ high timing clock cycles after the Rx data sensor 815 has detected the output of the demodulator 810.

The modulator 827 performs any necessary modulation and is under the control of the transceiver controller 820. Without the data provided from the burst generator 837, there is no modulation output from the modulator 827.

The uplink transmitting mixer 822 and Tx LO 821 transmit the uplink signal from different RF carriers. The Tx LO 821 is under the control of the transceiver controller 820.

The transceiver controller 820 is used for the physical layer of the remote terminal. It is fully under the control of the protocol controller or the central controller of the remote unit 800. The transceiver controller 820 can be combined with the central controller of the remote unit 800. It is not necessary to use multiple controllers for implementing the delay time compensation of the present invention.

A bank of demodulators 855 and a bank of packetizers 870 are implemented at the center control 850 side. Because of the multiple RF carriers used for the uplink channels, the center control unit 850 needs multiple demodulators to receive the uplink channel signals rapidly.

One function of the center control unit 850 is to calculate the initial timing difference between the downlink signal and the received uplink signals. The uplink signal received in the center control unit 850 is in the burst mode.

When the center control unit 850 sends out the downlink channel signals initially, the center control unit 850 knows where and what type of response it will receive. For example, it expects a small burst received in a slot time $T_{off}$ seconds time delay after finishing the downlink frame transmission. This is expected for the uplink channel 1. Similarly, the other uplink signals in other uplink channels can be predicted, too. To set up the timing reference, one transmitting counter in the center control unit 850 is reset and triggered immediately after it has finished its frame transmission. This counter runs under a high timing clock $T_N$.

The data sensing detector 857 shown in the center control unit 850 has a similar function as described with respect to the Rx data sensor 815 of the remote terminal 800. Because the received uplink channel signals are generated from different remote units randomly in time corresponding to the group demodulator 855, each demodulator is followed by a data sensing detector 857 (as described before, the uplink signal is only randomized within a slot time due to the different locations). The data sensing detector 857 detects the output of the demodulator based on the control of the protocol controller and Tx controller 860 of the center control unit 850. When the data sensing detector 857 detects the output of the data sensing block, it sends a flag to the Tx controller 860. The Tx controller 860 calculates the round trip delay time by determining the counter difference from the counter triggered to the flag received from the data sensing detector 857. This result is reported to the protocol controller and this message is inserted into the next frame and sent to the corresponding remote terminal. It is not necessary to have the timing adjustment response sent back to the remote terminal in the next downlink frame.

In other words, the remote unit 800 sends another shorter data burst with a corrected timing adjustment. The center control unit 850 checks and verifies the timing of the received second shorter data burst. If it is correct, the center control unit 850 sends the command from the downlink channel to allow the remote unit 800 to use the regular length of data burst for regular communication. If the center control unit 850 finds the remote unit 800 needs further timing adjustment, then the center control unit 850 sends the corresponding timing adjustment instructions from the downlink channel again.

In the present implementation, this invention is used in such a network that the propagation delay in a network (such as a CATV network) is fixed for each specified location. Theoretically, this invention can be implemented in any TDMA system regardless of whether the system propagation delay is fixed or not. In a TDMA system with a slowly changing propagation delay, the system efficiency might have limited improvement. Generally, if the speed of the information exchange between the remote unit and the central unit is faster than the slowly changing propagation delay, the system efficiency still can be improved by using this method.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A time division multiple access communications system in which a plurality of remote units communicate with a receiving station, the receiving station transmitting at least one downlink frame to each of said remote units, each of said remote units transmitting at least one uplink frame to said receiving station, comprising:

means, in the receiving station, for formatting and transmitting a downlink frame comprising n downlink traffic channel time slots where n is an integer, each time slot including a plurality of data bit intervals, means, in each remote unit, for formatting and transmitting an uplink frame comprising:

n uplink traffic channel time slots, each of said uplink traffic channel time slots being separated from a respective adjacent uplink traffic channel time slot by a respective guard time, wherein at least one of said n uplink traffic channel time slots includes x data bit intervals, x being a positive integer, said guard time being not greater than one data bit interval, and at least another of said n uplink traffic channel time slots includes x-y data bit intervals, y being a positive integer less than x, said guard time being greater than one data bit interval.

2. A time division multiple access communications system according to claim 1, wherein the guard time of the at least one uplink traffic channel time slot including x data bit intervals is not greater than one clock cycle of a high timing clock base signal, the clock cycle of the high timing clock base signal being shorter in duration than said one data bit interval.

3. A time division multiple access communications method in which a plurality of remote units communicate with a receiving station, the receiving station transmitting at least one downlink frame to each of said remote units, each of said remote units transmitting at least one uplink frame to said receiving station, comprising the steps of:

sending a short data burst with a first guard time from at least one of said remote units to said receiving station;

calculating a time differential at said receiving station between a reference time and a time at which said short data burst is received by said receiving station;

sending a timing adjustment instruction from said receiving station to said remote unit based on the time differential;

adjusting a transmitted timing reference at said remote unit based on the timing adjustment instruction;

verifying the adjusted transmitted timing reference at said receiving station; and beginning a regular communication by sending a plurality of regular data bursts from said remote unit to said receiving station using said adjusted transmitted timing reference, said regular data bursts each respectively employing a second guard time which is shorter in duration than said first guard time.

4. A time division multiple access communications method of claim 3, wherein the timing adjustment instruction is substantially equal to the propagation delay between said remote unit and said receiving station.

5. A time division multiple access communications method of claim 3, wherein the second guard time is one transmitted bit time.

6. A time division multiple access communications method of claim 3, wherein a high timing clock base signal is employed in calculating the time differential, said high timing clock base signal having a period that is less than one transmitted bit time.

7. A time division multiple access communications method of claim 6, wherein the second guard time is not greater than one clock cycle of the high timing clock base signal.

8. A time division multiple access communications method in which a plurality of remote premises interface devices (PIDs) communicate with a headend receiving station, the headend receiving station transmitting at least one downlink frame to each of said PIDs, each of said PIDs transmitting at least one uplink frame to said headend receiving station, comprising the steps of:

a. sending a short data burst from at least one of said PIDs to said headend receiving station;

b. measuring a time difference at said headend receiving station between a reference time and a time when said short data burst is received by said headend receiving station;

c. sending timing correction and adjustment information from said headend receiving station to said PID, said timing correction being derived from the time difference;

d. adjusting a timing of a plurality of regular data bursts to be sent by said PID to said headend receiving station; and e. sending a trial message from said PID to said headend receiving station.

9. A time division multiple access communications method of claim 8, further comprising the steps of:

f. repeating steps a. through e. until said PID receives an acknowledgment from said headend receiving station that the trial message was correctly transmitted by said PID; and g. sending said regular data bursts from said PID to said headend receiving station using said adjusting timing.

10. A time division multiple access communications method of claim 9, wherein said short data burst employs a first guard time and each of said regular data bursts employs a second guard time.

11. A time division multiple access communications method of claim 10, wherein the second guard time is one transmitted bit time.

12. A time division multiple access communications method of claim 10, wherein a high timing clock base signal is employed in calculating the time difference, said high timing clock base signal having a period that is less than one transmitted bit time.

13. A time division multiple access communications method of claim 12, wherein the second guard time is not greater than one clock cycle of the high timing clock base signal.

14. A time division multiple access communications method of claim 9, wherein the timing correction and adjustment information corresponds to a time interval which is substantially equal to the propagation delay between said PID and said headend receiving station.

* * * * *

UNITED STATES PATENT AND TRADE MARK OFFICE
CERTIFICATE OF CORRECTION

PATENT NO. : 5,710,765
DATED : 1/20/98
INVENTOR(S) : Xiaoyang Lee et al.

It is certified that error appears in the above-identified patent and that said Letters Patent is hereby corrected as shown below:

Column 1, line 4, please insert the following paragraph --This application claims the benefit of U.S. Provisional application No. 60/007,258, entitled METHOD AND APPARATUS WHICH INCREASE THE SYSTEM EFFICIENCY OF A TDMA SYSTEM BY REDUCING TIME SLOT GUARD TIME, filed Signed and Sealed this Ninth Day of February, 1999

*Attest:*

*Attesting Officer*

*Acting Commissioner of Patents and Trademarks*